R. J. BUSTILLO Y DIEGO.
DRAFTING APPLIANCE OR EQUIPMENT.
APPLICATION FILED JULY 1, 1919.
1,391,530.
Patented Sept. 20, 1921.
3 SHEETS—SHEET 1.
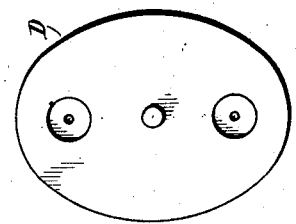
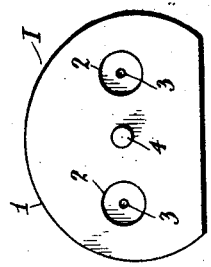
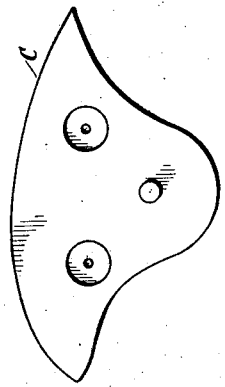
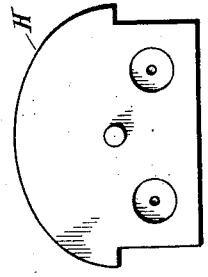
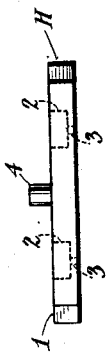
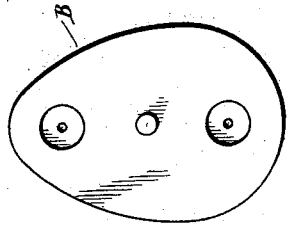
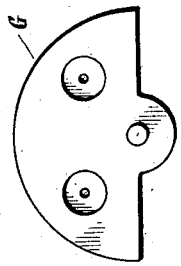
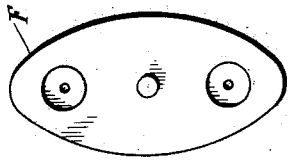
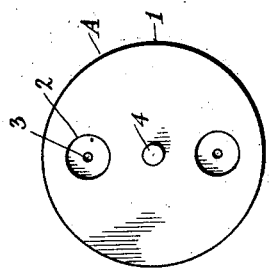
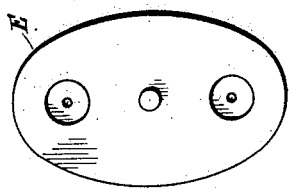
Fig. 1
Fig. 2
Witnesses
Inventor
Ramon J. Busillo y Diego
By
Attorney

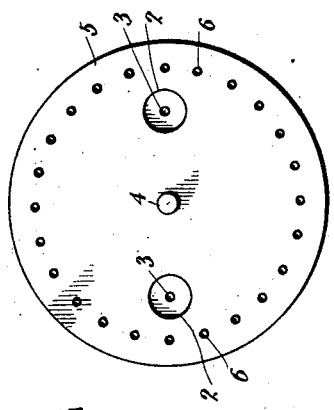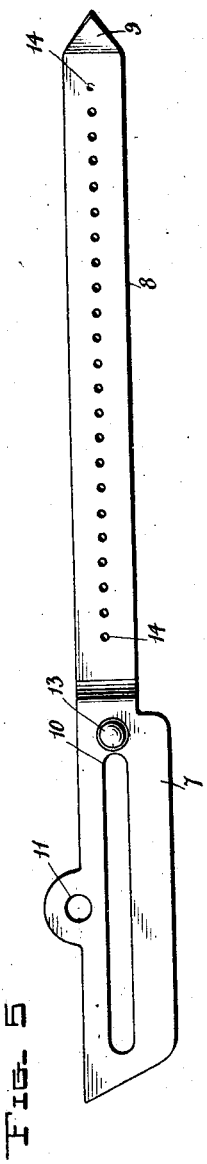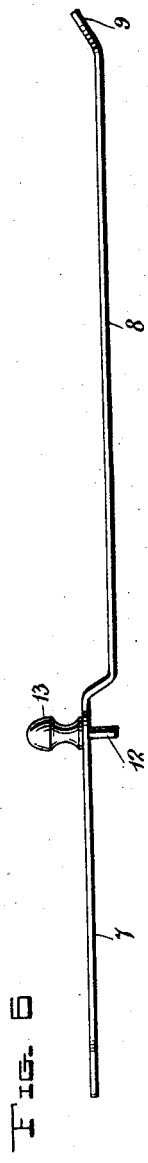

R. J. BUSTILLO Y DIEGO.
DRAFTING APPLIANCE OR EQUIPMENT.
APPLICATION FILED JULY 1, 1919.

1,391,530.

Patented Sept. 20, 1921.
3 SHEETS—SHEET 3.

Inventor
Ramon J. Bustillo y Diego,

Witnesses

UNITED STATES PATENT OFFICE.

RAMÓN J. BUSTILLO Y DIEGO, OF HABANA, CUBA.

DRAFTING APPLIANCE OR EQUIPMENT.

1,391,530.      Specification of Letters Patent.      Patented Sept. 20, 1921.

Application filed July 1, 1919. Serial No. 308,031.

*To all whom it may concern:*

Be it known that I, RAMÓN J. BUSTILLO Y DIEGO, a citizen of the Republic of Cuba, residing at Habana, Cuba, have invented certain new and useful Improvements in Drafting Appliances or Equipments, of which the following is a specification.

This invention relates to an improved drafting appliance or equipment conceived as having educational value, especially intended and adapted for use by children for the purposes of their instruction, and also of stimulating their originative or creative faculties in a manner calculated to afford entertainment and arouse and maintain their interest. In this aspect the improved appliance or equipment is simple and inexpensive and has the general character of an educational toy whose use combines the operations of the mind and of the hand and is, therefore, conducive to a quickening and broadening of the mental development of children at the age suitable for the primary grades, apart from affording instruction in the specific subject to which such use relates. This subject is the formation of geometrical outlines and their combination through an indefinite range into figures and designs; and the use of the equipment contemplates the production of well known conventional figures, the copying of designs, the creation of designs, and, in general, the combination, consistent with some basis of relationship, of varying geometrical outlines or forms.

For such objects and purposes the equipment consists of a number of templets, and of an active element, for convenience termed a scriber, by which the pattern lines may be reproduced on paper; and the invention consists in certain structural features appertaining to the templets, the scriber and the combination of the two, as will be set forth in detail in the succeeding description.

An embodiment of the invention is illustrated in the accompanying drawings, wherein:

Figure 1 is a group of plan views of nine different templets. In connection with this figure it is to be observed that any desired number of different templets may be provided, either greater or less than the number chosen for illustration, and that the only limitation on the number of outlines available for selection is that which is imposed by the requirement that the outline as embodied in the templet must be adaptable for coöperation with the scriber.

Fig. 2 is a view in edge elevation of one of the templets shown in Fig. 1 and illustrates features of relation which are common to all of the templets.

Fig. 3 is a plan view of a part which embodies certain essential structural characteristics of the templet shown in Fig. 1 and which, therefore, may, for convenience, be called a templet but which, in fact is an auxiliary part of the equipment adapted more particularly to the scribing of circles and to the selective graduation or marking into divisions of the circles scribed. The auxiliary templet shown in this figure has its perimeter marked off into a certain number of equal divisions and the equipment may contain one or several of such auxiliary templets; in the latter case each auxiliary templet will be graduated differently from the others.

Fig. 4 is an edge elevation of the templet shown in Fig. 3.

Fig. 5 is a plan view of the scriber.

Fig. 6 is a side elevation thereof.

Similar characters of reference designate corresponding parts throughout the several views.

Figure 7:
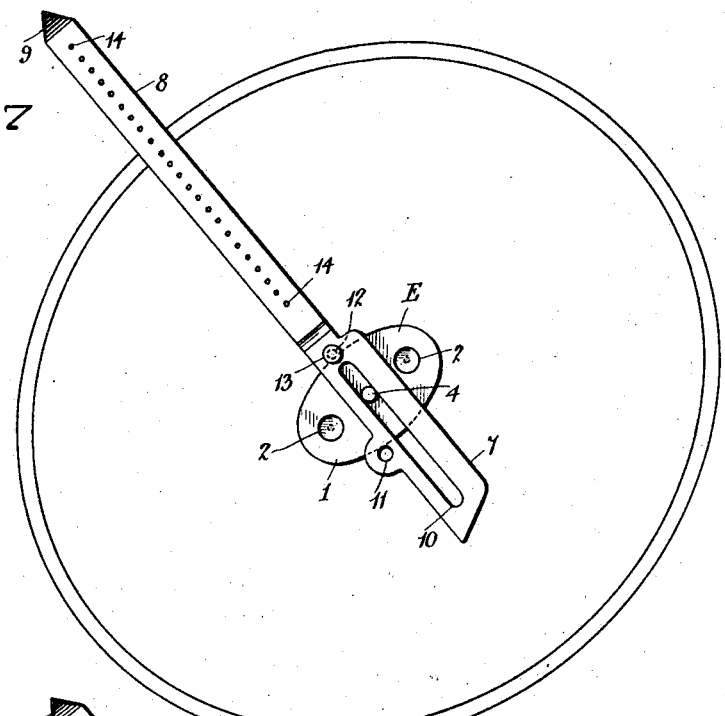
Fig. 7 is a plan view showing the scriber as used in connection with one of the templets shown in Fig. 1.

The templets 1 are in the form of plates of any suitable material having their upper and under faces substantially flat or otherwise formed to provide uniform and extensive bearing surfaces and having their edges, or portions of their edges, formed lineally in the outline of the patterns to be reproduced; and said templets are intended to be securely fastened over or in adjacency to the sheet of paper on which the lines, figures or designs are to be drawn. Their flat under faces have stable and extensive bearing upon the drawing board or other support; and the templets are held in position by a pair of thumb tacks. For this purpose their upper faces are formed with recesses 2, and apertures 3 extend from said recesses to their under faces. The heads of the thumb tacks are arranged in countersunk relation in the recesses 2 and the pointed shanks of such tacks extend through the apertures 3 into the drawing board in the well known manner. The templets may be removed by lifting them from the board and, as lifted, they disengage the thumb tacks which may thereupon be removed from the templets and preserved for further use. The templets 1 coöperate with the scriber to be hereafter described by means of their pattern edges and their flat upper faces and also by means of pins 4, with relation to which the scriber is slidable, these pins being fixed relatively to the templets and being preferably permanently secured thereon. The pins 4 are preferably located centrally with respect to the pattern edge of the templet.

The nine templets shown in Fig. 1 are distinguished by the letters A to I inclusive and their pattern outlines are as follows; that of A a circle, of B the elevation of an egg, of C a parabolic curve, of D an ellipse, of E and F different ovals, of G a semicircle, of H a cycloidal curve, and of I an epicycloidal curve. The templet 5 shown in Figs. 3 and 4 is intended for use where circles are to be marked off into equal divisions and it differs from the templets shown in Fig. 1 in that its upper face is provided, adjacent its periphery, with a number of equally spaced graduating marks 6 and in that its periphery is not required as a pattern edge and, therefore, need not be relied on for the pattern function discharged by the edges or portions of the edges of the several templets shown in Fig. 1. In other respects, the templet 5 has the structural features and the functions of the templets shown in Fig. 1. The graduations 6 may be provided in any desired number. For example, the templet 5 as shown has twenty-four graduations, but it might equally well have a smaller or larger number of graduations, for example, eighteen or thirty, the only requirement being that the number shall have a sufficient number of multiples to enable several selections for the fractional division of the circle. It is obvious that the range of selection may be increased by providing two or more templets similar to the templets 5 but differing from one another in their number of graduations, for example, two additional templets provided with eighteen and thirty graduations respectively. It is also obvious that the graduating marks may have any suitable form. As shown, they are formed as small indentations near the periphery of the templet but they might equally well be formed as radial lines or as notches in the periphery, the only requirement being that they shall be readily visible on looking at the upper face of the templet.

The scriber shown in Figs. 5 and 6 is designed to coöperate with any of the templets as an arm movable in relation thereto and guiding a pencil or stylus by which the line is drawn on the paper. In this function the scriber consists of a relatively long straight part, preferably of metal and having a desirable lightness and thinness, which part has a guiding portion 7 and a scribing portion 8. The portions 7 and 8 are preferably offset in parallel planes whereby the portion 7 may bear extensively upon the flat upper face of the templet and the portion 8 may bear upon the sheet of paper on which the lines, figures or designs are to be drawn. The portion 8 is resilient and if, for any reason, it should be desired to lift said portion slightly above the sheet of paper, without displacing the scriber relatively to the templet, this can readily be done by means of an up-turned lip 9 at the free end of the portion 8. The guiding portion 7 is provided with a relatively long longitudinal slot 10 for coöperation with the pins 4 of the templets 1. This slot may likewise coöperate with the similar pin of the templet 2; but for coöperation with the pin of the templet 5 the guiding portion 7 is preferably provided with an aperture 11 conforming to said pin and arranged at one side of the slot 10. For coöperation with the pattern edges of the templets 1 the guiding portion 7 is also provided with a depending pin 12 which bears against said edges and in conjunction with the slot 10 and pin 4 prescribes the movement of the scriber, causing it to follow the pattern edges. The movement of the scriber is conveniently effected by a finger-piece 13 which projects in upright relation and is preferably mounted upon the guiding portions 7. The pencil or stylus is, of course, held in fixed relation to the guiding portion 8 and the latter is so constructed that said pencil or stylus may be located at different points in the length of said scribing portion, thereby to enable variations in the amplitude of the line or figure drawn. For this purpose, it is convenient and preferred to provide the scribing portion 8 with a longitudinal row of somewhat closely associated apertures 14 which are arranged throughout the length of said scribing portion and through any one of which the point of the pencil or stylus may be inserted whereby it will trace a line upon the paper in accordance with the movements of the scribing portion 8.

Fig. 7 illustrates one use of the appliance, the scriber being shown in coöperation with the templet E for the purpose of producing an oval outline which is an amplification of the marginal outline of said templet. The slot 10 of the scriber takes over the pin 4 and the finger-piece 13 is used to move the scriber through the circuit of the pattern and to cause the pin 12 to bear against the pattern edge of the templet. In the case of all outlines which are not circular and which may, therefore, be termed irregular outlines, the scriber will perform both pivotal and slidable movements relatively to the templet and in such movements it will be centered by the pin 4 in coöperation with the slot 10 and will be guided by the pin 12 in coöperation with the pattern edge.

In Fig. 7 there is also shown the reproduction in differing degrees of amplitude of two ovals conforming to the templet E, the pencil or stylus in one operation having been placed in one of the apertures 14 and in the succeeding operation having been placed in an adjacent aperture 14.

Figure 8:
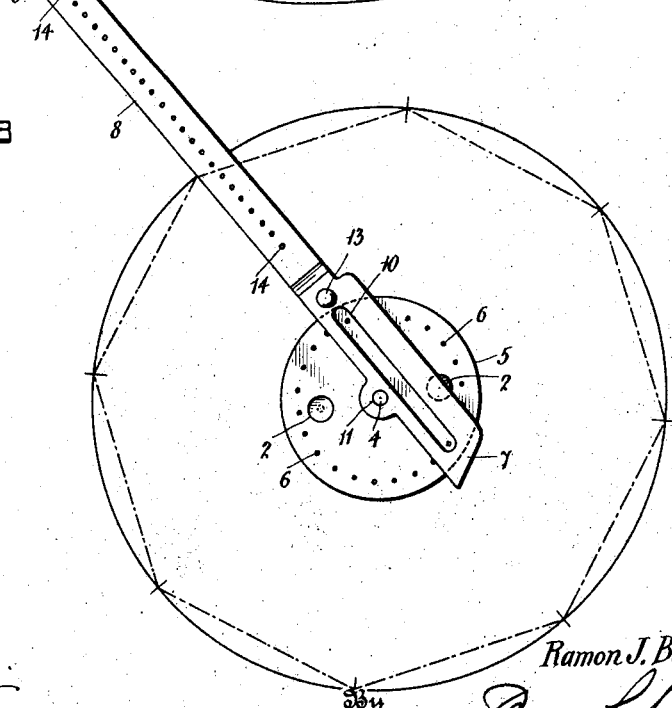
Fig. 8 is a plan view showing the scriber as used in connection with the templet shown in Fig. 3.

Fig. 8 illustrates the use of the scriber in connection with the templet 5. In this case it is preferred to center the scriber relatively to the pin of the templet by means of the opening 11, thus eliminating any possibility of the sliding play which is necessary when the scriber is used with a templet having an irregular, i. e., non-circular pattern edge. The templet 5 is, as explained, intended for use where the circle drawn is to be marked off into divisions; and in such use the slot 10 is of value in that it will singly expose each of the graduations 6 during the revolution of the scriber and will enable said graduations to be readily counted, thereby to facilitate the marking of the circles into divisions. For example, the circle shown in Fig. 8 has been marked off into eight equal portions to enable an octagon to be produced as the ultimate outline; and with a templet as shown, having twenty-four graduations, the graduations are counted during the movement of the scriber in groups of three, a mark on the perimeter of the circle being made each time that the third graduation of the group is exposed through the slot 10.

It is also obvious that any of the templets 1 may be used for drawing circles by fitting the aperture 11 of the scriber over their pins 4; in such use the pattern edges of the templets will, of course, have no function. Where it may be desired to draw a circle smaller than the smallest circle which can be drawn by the scriber from any radius taken from the opening 11, the templet A of Fig. 1 is used and in such use the slot 10 is fitted over the pin 4 whereby the circular edge of the templet will function as a pattern edge.

It will be apparent from the foregoing description that the pattern lines may be reproduced with precision and facility and that the amplitude of reproduction may be selectively varied through a wide range.

The equipment above described is complete in itself both inventively and functionally but its greatest value is realized when it is employed in connection with conventional drawing auxiliaries, such as the draftsmen's ruler and square.

Having fully described my invention, I claim:—

1. An educational device including, a plurality of templets having pattern edges of different configuration and each templet having a pin projecting from the upper surface thereof, a scriber arm adapted to be used separately and selectively with any one of said templets and having a longitudinal slot therein for engaging said pin, and a pin fixed to said arm adapted to coöperate with said pattern edges for tracing the contour thereof on an amplified scale.

2. An educational device of the character described including, a scriber arm having a guiding portion provided with a depending pin and formed with a longitudinal slot, said scriber arm also having a scribing portion off-set from said guiding portion, a plurality of templets each having upper and lower substantially flat bearing faces adapted to contact respectively with said guiding portion and the paper on which the designs are to be drawn, a pattern edge adapted to coöperate with said depending pin in guiding the scriber arm, and a pin projecting from the upper surface thereof for engaging in said longitudinal slot, whereby said scriber arm may be used separately and selectively with any one of said templets for tracing the outline of their pattern edges.

3. An educational device including, in combination, a templet having upper and lower substantially flat bearing faces, a circular pattern edge, a pin projecting from the center of the upper face, and a plurality of marginal graduations on said upper face subdividing the circle into a number of equal parts, and a scriber arm having an aperture adapted to engage said pin and a longitudinal slot adapted to expose individual graduations to the view of the operator of the scriber arm.

In testimony whereof I have hereunto set my hand in presence of two subscribing witnesses.

RAMÓN J. BUSTILLO y DIEGO.